(12) United States Patent
Hanzlik et al.

(10) Patent No.: US 8,805,733 B1
(45) Date of Patent: Aug. 12, 2014

(54) SINGLE PREMIUM DEFERRED ANNUITY (75) Inventors: David Hanzlik, Madison, WI (US);
Sarah R. Donahue, Long Grove, IL (US); Robert Koth, South Elgin, IL (US)

(73) Assignee: Allstate Insurance Company, Northbrook, IL (US)

( * ) Notice: Subject to any disclaimer, the term of this patent is extended or adjusted under 35 U.S.C. 154(b) by 26 days.

(21) Appl. No.: 13/248,091

(22) Filed: Sep. 29, 2011

Related U.S. Application Data

(60) Provisional application No. 61/388,348, filed on Sep. 30, 2010.

(51) Int. Cl.
*G06Q 40/00* (2012.01)
(52) U.S. Cl.
USPC ............. 705/37; 705/4; 705/1.1; 705/35
(58) Field of Classification Search
CPC ..... G06Q 40/04; G06Q 40/08; G06Q 50/188; G06Q 40/00
USPC ................................. 705/35–40, 4, 1.1
See application file for complete search history.

(56) References Cited

U.S. PATENT DOCUMENTS

| | | | |
|---|---|---|---|
| 5,893,071 A | 4/1999 | Cooperstein | |
| 5,933,815 A | 8/1999 | Golden | |
| 7,120,601 B2 | 10/2006 | Chen et al. | |
| 7,676,414 B1 * | 3/2010 | Abbs et al. | 705/35 |
| 7,860,773 B1 * | 12/2010 | Golden | 705/36 R |
| 7,870,060 B2 | 1/2011 | Barker et al. | |
| 7,877,306 B2 * | 1/2011 | Michalowski et al. | 705/35 |
| 8,095,397 B2 | 1/2012 | Gray et al. | |
| 8,095,398 B2 | 1/2012 | Dellinger et al. | |
| 2003/0069821 A1 | 4/2003 | Williams | |
| 2003/0104857 A1 | 6/2003 | Jenkins | |
| 2003/0105690 A1 | 6/2003 | Brown et al. | |
| 2004/0078244 A1 | 4/2004 | Katcher | |
| 2004/0088236 A1 * | 5/2004 | Manning | 705/35 |
| 2004/0153388 A1 | 8/2004 | Fisher et al. | |
| 2005/0234821 A1 * | 10/2005 | Benham et al. | 705/40 |
| 2006/0031149 A1 | 2/2006 | Lyons et al. | |
| 2006/0253354 A1 * | 11/2006 | O'Callahan | 705/35 |
| 2008/0059382 A1 * | 3/2008 | Burczyk | 705/36 R |
| 2008/0071697 A1 | 3/2008 | Midlam et al. | |

(Continued)

FOREIGN PATENT DOCUMENTS

| | | | | |
|---|---|---|---|---|
| TW | 201108141 A | 3/2011 | | |
| WO | 9909500 | 2/1999 | | |
| WO | WO 2009014592 A1 * | 1/2009 | ............ | G06Q 40/00 |
| WO | WO 2009029142 A1 * | 3/2009 | ............ | G06Q 40/00 |

OTHER PUBLICATIONS

Pechter, Kelly, "'Collar Strategy' For Your Variable Annuity", Annuity FYI Blog, www.annuityfyi.com/blog/2011/10/collar-strategy-for-your-variable-annuity, Feb. 9, 2012.

(Continued)

*Primary Examiner* — Edward Baird
(74) *Attorney, Agent, or Firm* — Banner & Witcoff, Ltd.

(57) ABSTRACT

Systems and methods relating to a single premium deferred annuity are provided. In one embodiment, the annuity may be used for retirement planning. Aspects disclosed herein relate to an annuity that provides protection against market losses and allows the purchaser/owner to choose the level of protection.

12 Claims, 2 Drawing Sheets

(56) References Cited

U.S. PATENT DOCUMENTS

| | | |
|---|---|---|
| 2008/0270194 A1* | 10/2008 | West et al. .................. 705/4 |
| 2009/0027637 A1 | 1/2009 | Soer et al. |
| 2009/0030738 A1* | 1/2009 | Golembiewski .......... 705/4 |
| 2009/0030739 A1* | 1/2009 | Tatro et al. .................. 705/4 |
| 2009/0030824 A1* | 1/2009 | Michalowski et al. ......... 705/35 |
| 2009/0063203 A1* | 3/2009 | Baiye ........................ 705/4 |
| 2009/0094070 A1 | 4/2009 | Harris et al. |
| 2009/0106140 A1 | 4/2009 | De La Motte |
| 2009/0106167 A1 | 4/2009 | Kravitz et al. |
| 2009/0132430 A1* | 5/2009 | Weiss ...................... 705/36 R |
| 2009/0177575 A1 | 7/2009 | Hays |
| 2009/0192829 A1 | 7/2009 | Long et al. |
| 2009/0271224 A1 | 10/2009 | Lange |
| 2010/0010928 A1 | 1/2010 | O'Callahan |
| 2010/0100473 A1 | 4/2010 | Nations |
| 2010/0211405 A1 | 8/2010 | Lutnick et al. |
| 2011/0010310 A1 | 1/2011 | Tatro et al. |
| 2011/0131150 A1 | 6/2011 | Golden |

OTHER PUBLICATIONS

Szado et al., "Collaring the Cube: Protection Options for a QQQ ETF Portfolio", Apr. 2008.

* cited by examiner

SINGLE PREMIUM DEFERRED ANNUITY

CROSS REFERENCE TO RELATED APPLICATIONS

This application is a non-provisional of and claims priority to provisional U.S. Application No. 61/388,348, filed Sep. 30, 2010, and entitled "Single Premium Deferred Annuity," the entire disclosure of which is hereby incorporated by reference in its entirety and for all purposes.

FIELD OF THE INVENTION

The disclosure relates to methods and systems relating to annuities. More particularly, the disclosure provides systems and methods for creating and implementing a single-premium deferred annuity.

BACKGROUND

Currently, there are a number of financial products available to assist users in saving for their short and long term goals. These types of financial plans are used to fulfill user's financial goals which may include funding an emergency fund, college savings, retirement savings, and/or life insurance products. Various annuity plans may be implemented to fulfill these or other financial goals. One example, an Equity Indexed Annuity ("EIA") may protect against loss in a market, but they also significantly limit the upside potential of the purchaser. Specifically, a holder may reap the rewards of the upside when the index that the annuity is tied to experiences gains, and the holder is protected from a downward trend in a market through a fixed minimum return (such as, for example, 2-3%). A Variable Annuity ("VA") generally provides performance guarantees, such as accumulation principle guarantees. Other instruments, such as a Bank Equity CDs may also limit a holder's risk, however, like EIAs and other instruments, they also limit upside gains that may be available if the monetary resources were invested in another financial plan or otherwise invested within other instruments.

New and improved instruments that provide protection against market losses and also permit the selection of a level of protection and market growth potential would be desirable.

SUMMARY

Aspects of the disclosure overcome problems and limitations of the prior art by providing systems and methods relating to a single premium deferred annuity. In one embodiment, the annuity may be used for retirement planning Aspects disclosed herein relate to an annuity that may provide protection against market losses and allows the purchaser/owner to choose the level of protection. In one embodiment, an annuity may include two phases. For example, an accumulation phase may first be initiated upon formation (or first time period following formation of) of the annuity. In certain implementations, an accumulation phase may comprise an investment option period and an optional access account period.

An exemplary investment option period may be implemented on the issue date and continue for a specified length of time, such as for example, 10 years. In yet other embodiments, the specified length of time may be set according to an event. The predetermined quantity of time may be negated upon occurrence of one or more events, such as for example, death of an individual. Computer-implemented instructions may be executed to allocate at least a portion of the single premium to one or more investment options. Various options may each be associated with specified index and Maximum Investment Performance Rate and Minimum Investment Performance Rate. Values relating to the annuity may be calculated in accordance with various embodiments.

An optional access account period may be initiated upon expiration of the investment option period or predefined event. Following the accumulation phase, a payout phase may be initiated. Depending on different implementations, the payout phase may begin at the time that the Interim Value (during the Investment Option Period), Maturity Value (at the end of the Investment Option Period) or Access Account Value (during the Access Account Period) is applied to an income plan.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below. The details of these and other embodiments of the present disclosure are set forth in the accompanying drawings and the description below. Other features and advantages of the disclosure will be apparent from the description and drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

Exemplary Operating Environment

In the following description of the various embodiments, reference is made to the accompanying drawings, which form a part hereof, and in which is shown by way of illustration, various embodiments of the invention that may be practiced. It is to be understood that other embodiments may be utilized and structural and functional modifications may be made without departing from the scope of the present invention.

Figure 1:
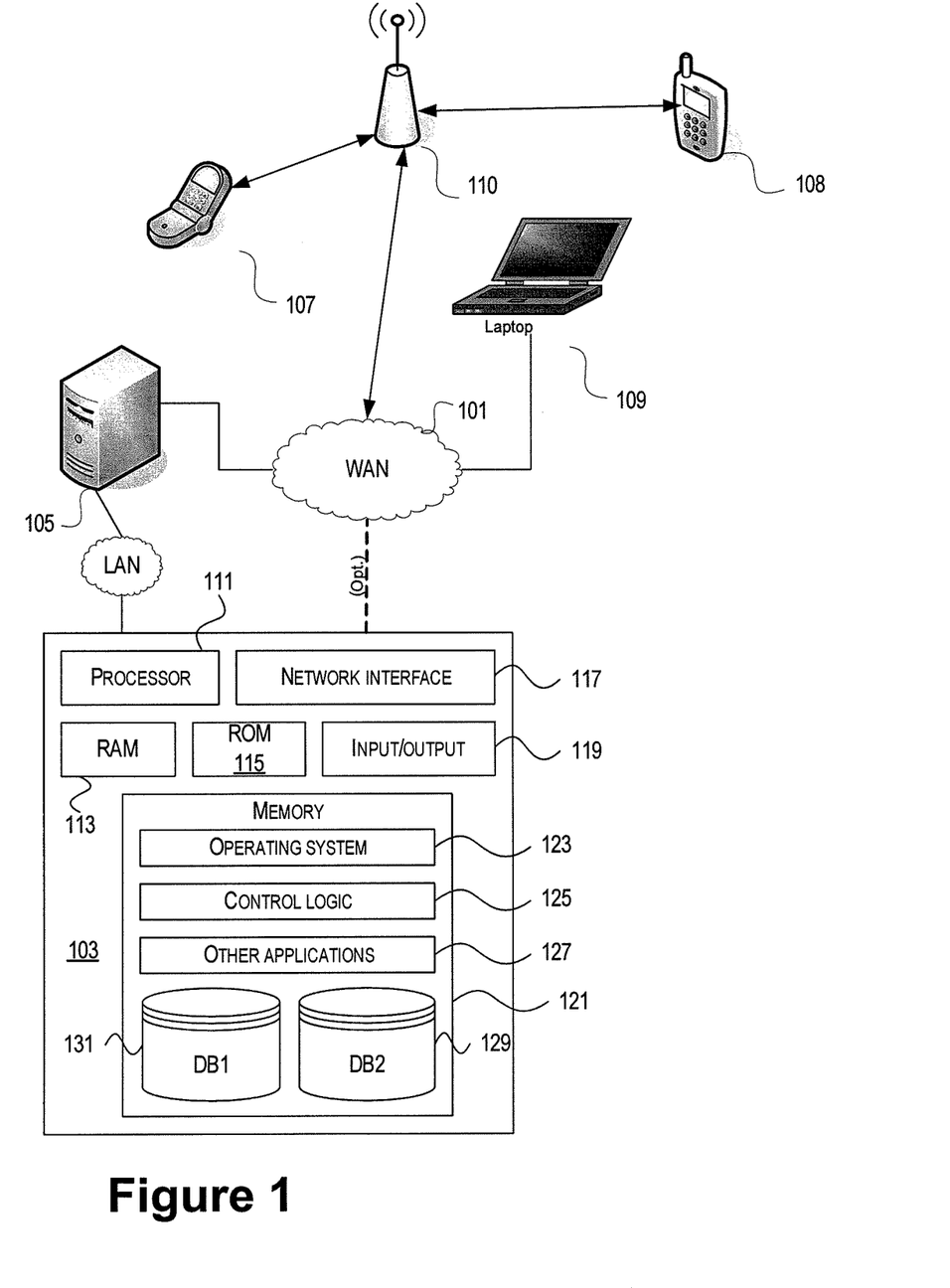
FIG. 1 illustrates an illustrative network architecture and data processing device that may be utilized in accordance with an aspect of the disclosure.

FIG. 1 illustrates one example of a network architecture and data processing device that may be used to implement one or more illustrative aspects of the invention. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (such as PDA device 108 and/or other devices not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include financial development plan server 103, actuarial server 105, and user computers 107, 109. Financial development server 103 provides overall access, control and administration of databases and control software for performing one or more illustrative aspects of the invention as described herein. Financial development server 103 may be connected to actuarial server 105 through which users interact with and obtain data as requested. Alternatively, financial development server 103 may act as an actuarial server itself and be directly connected to the Internet. Financial development server 103 may be connected to actuarial server 105 through the network 101 (e.g., the Internet), via direct or indirect connection, or via some other network. Users may interact with the financial development server 103 using remote computers 107, 109, e.g., using a web browser to connect to the financial development server 103 via one or more externally exposed web sites hosted by actuarial server 105. Client computers 107 and 109 may be used in concert with financial development server 103 to access data stored therein, or may be used for other purposes. For example, from client device 107 a user may access actuarial server 105 using an Internet browser, as is known in the art, or by executing a software application that communicates with actuarial server 105 and/or financial development server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by actuarial server 105 and financial development server 103 may be combined on a single server.

Each component 103, 105, 107, 109 may be any type of known computer, server, or data processing device. Financial development server 103 may include a processor 111 controlling overall operation of the financial development server 103. Financial development server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing financial development server 103 to perform aspects of the invention as described herein, and other application software 127 providing secondary support, and/or other functionality which may or may not be used in conjunction with aspects of the present invention. The control logic may also be referred to herein as the financial development server software 125. Functionality of the financial development server software may refer to operations or decisions made automatically based on rules coded into the control logic, made manually by a user providing input into the system, and/or a combination of automatic processing based on user input (e.g., queries, data updates, etc.). Those skilled in the art will realize that components 105, 107, and 109 may also include similar hardware components (e.g., processor, RAM/ROM, memory, etc.) as discussed above with respect to financial development server 103.

Memory 121 may also store data used in performance of one or more aspects of the invention, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects of the invention may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Exemplary Processes

Figure 2:
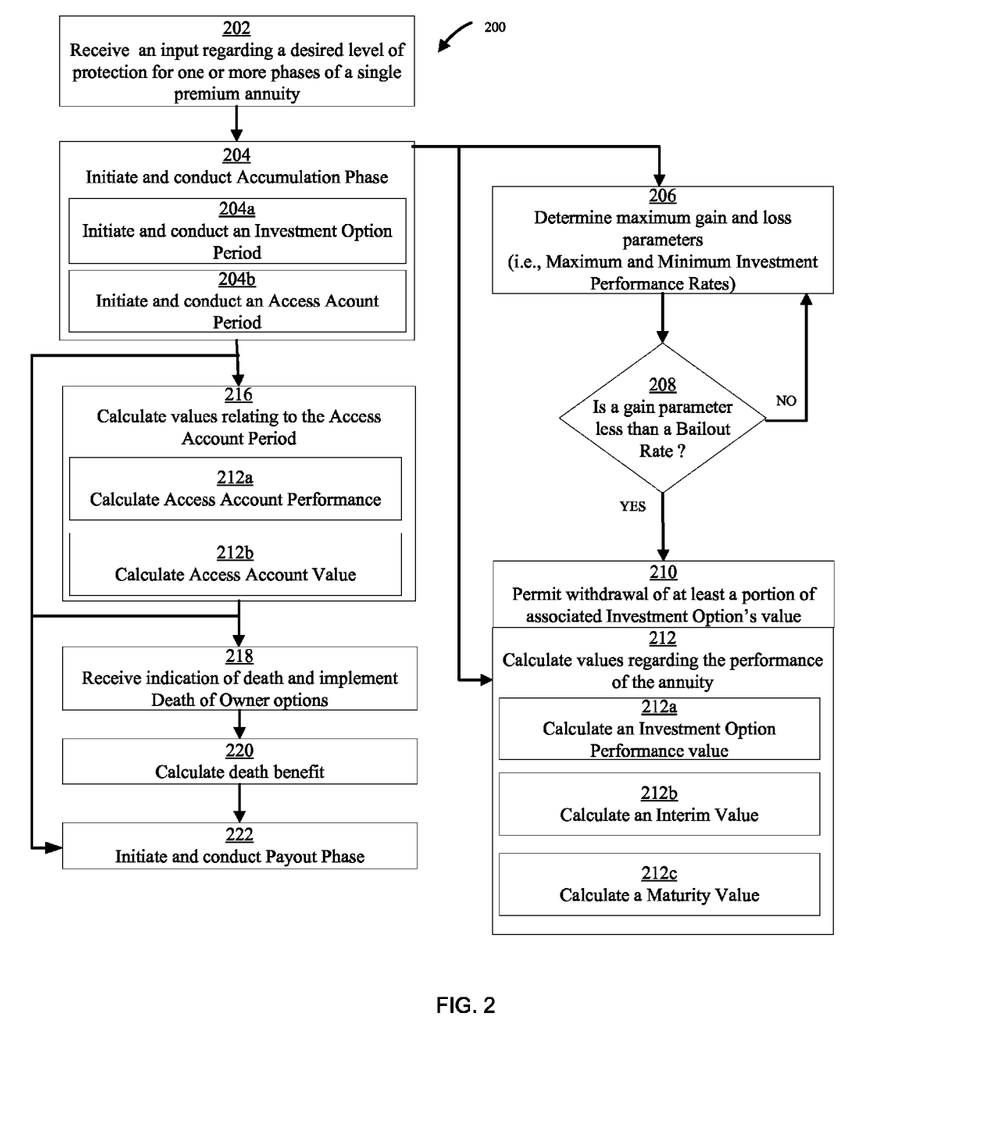
FIG. 2 is a flowchart of an illustrative method for implementing a single premium deferred annuity that may be utilized in accordance with an embodiment of the invention.

FIG. 2 illustrates a flowchart of an exemplary method that may be implemented in accordance with various embodiments to implement a single premium deferred annuity. In one embodiment, block 202 may be implemented to receive an input regarding a desired level of protection for one or more phases of a single premium annuity. In one embodiment, block 202 may be implemented to receive electronic signals indicative of a user purchasing a single premium deferred annuity and/or selecting one or more investment options. An input may comprise information transmitted from one or more of client computers 107-109 and/or PDA device 108, and as such may be received through WAN 101 of the network architecture shown in FIG. 1. For example, a user may utilize one or more of client computers 107-109 to provide a user input, such as through a user input device (for example, such as a keypad, touch screen, voice interface, one or more arrow keys, joy-stick, data glove, mouse, roller ball, touch screen, or the like). In this regard, a graphical user interface ("GUI") may permit the user to select one or more investment options relating to varying levels of protection.

Inputs received at block 202 may trigger the occurrence of or take place during a first phase of the annuity. Usage of "first phase" or any other numerical indication of phases, periods, options, or other features disclose herein, is not intended to require a required order, but rather to distinguish among similar phases or features. In this regard, one or more "phases" may be overlapping with one or more other phases. Yet, in other embodiments, the termination of one phase may trigger implementation of a second phase. Examples of various phases will now be described in reference to illustrative embodiments.

In one embodiment, a first phase may be an Accumulation Phase. An Accumulation Phase (such as, for example, implemented at block 204) may be automatically triggered upon formation of the annuity (such as reception of a purchase payment), yet in other embodiments, it may be dictated by other or additional factors. A value (such as a Maturity Value) of the annuity during the Accumulation Phase may be correlated to the performance of a specified, established index(s), subject to a stated minimum and maximum rate.

An Accumulation Phase may comprise at least two time intervals, such as an Investment Option time interval ("Investment Option Period") and an Access Account time interval ("Access Account Period"). In one embodiment, block 204a may be initiated to execute the initiation of an Investment Option Period on the issuance of the annuity. Thus, in certain embodiments in which the Accumulation Phase begins upon reception of the payment price, the Investment Option Period may also be automatically initiated. The Investment Option Period may be a predetermined quantity of time. For example, in one embodiment, the Investment Option Period may be about 10 years. In yet other embodiments, the predetermined quantity of time may be negated upon occurrence of one or more events, such as for example, death of an individual. Computer-implemented instructions may be executed to allocate at least a portion of the single premium to one or more Investment Options. The allocation may be in accordance with one or more inputs received at block 202. Further, certain embodiments may be configured to permit the reception of inputs altering the selection of Investment Options during the Accumulation Phase. Thus, certain embodiments may permit further inputs to change Investment Options.

During an Accumulation Phase (including the Investment Option Period), computer-executable instructions, such as located on a non-transitory computer-readable medium on financial development plan server 103 and/or actuarial server 105, may be executed by a processor, such as processor 111, to update electronic files associated with the annuity to indicate the value accruing (or declining) based, at least in part, on maximum gain and loss parameters (see, e.g., block 206). For example, a Minimum Investment Performance Rate and/or Maximum Investment Performance Rate (collectively, Investment Performance Rates) may be determined for one or more investment options available through the single-premium deferred annuity.

Minimum Investment Performance Rates may be attributed to market loss, such as based upon the Standard and Poor's 500 (S&P500), the Dow Jones Industrial Average ("DJIA"), or any other index or combinations of indices. Any quantitative economic or financial measure may be utilized to determine Investment Performance Rates in accordance with various embodiments. As used herein for simplicity, the phrase "Investment Index" refers to any quantitative economic or financial measure, inclusive of market indices, from which one or more of the Investment Performance Rates may be based (at least partially) on. For example, the S&P 500 may be an Investment Index of a first annuity and yet the DJIA may be an Investment Index utilized in conjunction with a second annuity.

In one embodiment, various options or plans (or phases thereof) may limit market losses (i.e., the "Minimum Investment Performance Rate") to a certain percentage per time interval. For example, a first plan may limit losses to no more than −15% a year, a second plan may limit market losses limited to no more than −5% a year, and a third plan may limit market losses to 7% a year. Those skilled in the art will readily appreciate with the benefit of this disclosure that the above-referenced percentages are merely exemplary and that other percentages (or values) may be utilized in accordance with various embodiments of the invention.

As discussed above, various plans (or phases thereof) may also limit market gains (which may be referred to as "Maximum Investment Performance Rate") to a certain percentage per time interval. For example, a maximum market gain value may be calculated (see, e.g. block 206). A maximum market gain value may be calculated, at least in part, based upon a maximum market loss value (e.g., as calculated in block 206) for that option or plan. The maximum market gain value may be calculated with processor 111 of finance development plan server 103, for example as shown in FIG. 1. For example, computer-executable instructions (which for example, may be located on an tangible computer-readable medium, including for example, memory 121, RAM 113 and/or ROM 115 and may be executed by processor 111 to provide a higher maximum market loss value based upon a lower maximum market gain value. For example, in one embodiment of the first plan described above (which has a maximum market loss value of −15%), therefore, systems and methods disclosed herein may be implemented to calculate a maximum market value gain value of 20%, whereas the second plan may be associated with a lesser maximum market gain value, such as for example, 12%, and the third plan may be associated with an even lower maximum market gain value, such as 7%. The market gain value may be correlated to market gains of any quantitative economic or financial measure, such as the indices discussed above. For example, the maximum market loss value and the maximum market gain value may both be correlated to a single index, such as the Standard and Poor's 500 (S&P500), the Dow Jones Industrial Average ("DJIA"), or any other index or combinations of indices. Further embodiments may permit or implement variations to what is being collared. For example, in one embodiment, a user may be able to select what the collar is based on. For example, in one embodiment, the user may switch between different index or frames of reference for the correlation. Exemplary indexes or references may be: commodities or foreign exchanges rates (either individually or indexed).

Determinations of one or more of the Investment Performance Rates may occur before, during or after blocks 202 and/or 204 and be updated on a routine, semi-routine, and/or event-driven basis. In one embodiment, a Maximum Investment Performance Rate is the highest percentage by which an Investment Option (options available to the annuity holder to invest during the Investment Option Period) value may be increased during a time interval, such as a year (referred to as a "Contract Year"). In certain embodiments, if a value for the Minimum Investment Performance Rate is positive or zero, then the Minimum Investment Performance Rate may specify the lowest percentage by which an Investment Option's Maturity Value (discussed below) may increase during any specified time interval, such as a Contract Year. If, however, if a value of the Minimum Investment Performance Rate is negative, then the Minimum Investment Performance Rate may specify the greatest percentage by which an Investment Option Maturity Value may decrease during the Contract Year. In various embodiments, Investment Performance Rates may decrease or increase for different time intervals and may vary based one or more factors, including time, such as a year of the annuity, Maturity Value and/or the purchase payment.

Thus, in accordance with various embodiments, a single premium deferred annuity may provide Investment Options that inversely correlate a Minimum Investment Performance Rate with the Maximum Investment Performance Rate, such that an increased risk of loss may be associated with an increased reward of possible gains. The calculation of a maximum market gain value may be based (at least in part) upon the calculation or determination of a maximum market loss value, yet in other embodiments, the calculation of a maximum market loss value may be based (at least in part) upon the calculation or determination of a maximum market gain value.

In certain embodiments, collars (such as between a Minimum Investment Performance Rate and a Maximum Investment Performance Rate or other maximum or minimum rates) may be modified on a routine basis, such as for example, every year, month, or week. For example, in one embodiment, a user input may establish the single premium deferred annuity, however, a user may have the flexibility to manage the collar over its lifetime, or a portion thereof. In one embodiment, this feature may be provided without any additional charges or fees.

In further embodiments, there may be more than one set or collars of maximum or minimum rates or gains. For example, a user may elect or be presented with an opportunity to elect a plurality of different Investment Options, wherein at least one Investment Option has a different collar than another Investment Option. In certain embodiments, a user may be permitted to transfer resources amongst different Investment Options. In one such embodiment, the user may be permitted to transfer resources at certain intervals, such as for example, an annual interval. Yet in other embodiments, the user may be permitted to transfer resources at any time. In another embodiment, the user may have predefined quantities of transfers per unit of time, such as a quarter or a year. In further embodiments, the annuity may have an extended guarantee period.

Certain embodiments may be directed towards an annuity that may automatically re-allocate resources among one or more different Investment Options (including the selection of new options). In one embodiment, resources may be re-allocated at certain intervals, such as for example, an annual interval. Yet in other embodiments, re-allocation may occur upon the occurrence of one or more events. In one embodiment, the re-allocation is based upon one or more risk-based tolerances. For example, an estimated or determined age or years until the user retires or reaches a certain time point may be utilized in one embodiment. Thus, in certain embodiments, a glide path may be generated for the annuity or one or more Investment Options of the annuity. In certain embodiments, the value of an account may increase within the annuity by annual income and/or a life insurance policy collar.

In addition to being associated with Investment Performance Rates (which are linked to an Investment Index), various Investment Options may be associated with a Bail Out Rate, which is a predetermined rate that may be set upon issuance of the annuity. For example, computer-executable instructions located on a computer-readable medium may be executed to perform a method that comprises determining if a gain parameters (such as the Maximum Performance Rate) for an Investment Option is less than a Bailout Rate value (for example, as represented by block 208). If it is determined that a Maximum Performance Rate is less than the specified Bail Out Rate value than in certain embodiments, methods and systems may be configured to permit a withdrawal (or a portion of) the associated Investment Option's value (see, e.g. block 210). In one embodiment, the value compared against the Bail Out value may be a Maturity Value (described below in relation to block 212). Depending on the comparison, a withdrawal of funds from the annuity may be permitted without certain withdrawal fees that otherwise would be assessed.

Block 212 may be implemented, for example during an Investment Option Period, to calculate one or more values regarding the performance of the annuity. For example, in one embodiment, an "Investment Option Performance" value may be calculated (see, e.g., block 212*a*). In accordance with various embodiments, an Investment Option Performance value may be assigned (or assignable) on a daily basis. For example, in one embodiment, an Investment Option Performance value may be computed as the Investment Option Index value as of that date, divided by the Investment Option Index value at the later of the previous date a Death Benefit (discussed later) or a withdrawal was taken and the beginning of the current Contract Year, minus one. In certain embodiments, an Investment Option Index value for either date will not be less than the Investment Option Index Value as of the beginning of the current Contract Year, multiplied by (1+the Minimum Investment Performance Rate). In further embodiments, the Investment Option Index Value for either date will not be greater than the Investment Option Index Value as of the beginning of the current Contract Year, multiplied by (1+the Maximum Investment Performance Rate). The Investment Option Performance value may be reflected in an Investment Option Maturity Value and Investment Option Interim Value throughout the year. At the end of each Contract Year, an Investment Option Performance value for that Contract Year may be made final.

An Interim Value may be calculated (see block 212*b*), for example, by summing the values of all Investment Options. In one embodiment in which the specified time interval (such as the anniversary of the issuance of the annuity, referred herein as a "Contract Year"), the Interim Value may be determined in accordance with Equation 1.

$$\text{Investment Option Interim Value} = A^*(1-B)^*(1+C)^*D, \quad \text{Equation 1:}$$

where $A$=Investment Option Maturity Value as of the later of the previous day on which a withdrawal was taken, and the beginning of the current Contract Year. At issue of the annuity, this amount equals the portion of the purchase payment allocated to that particular Investment Option. At the beginning of the current Contract Year, this amount equals the Investment Option Maturity Value as of the end of the previous Contract Year, adjusted for Transfers.

$B$=any annual charges or fees (hereinafter "Annual Charge"), if the date used in determining A in this formula is the first day of a Contract Year. Otherwise, it is zero.

$C$=Investment Option Performance as described above.

$D=((1+E)/(1+F))^G$, where:

$E$=The Fair Value Index, computed as of the Issue Date, based upon the value of specified financial instruments, which in one embodiment may be indicated in an Annuity Data Page, of a maturity corresponding to the original or remaining length of the Investment Option Period;

$F$=The Fair Value Index, computed as of the current date, based upon the value of specified financial instruments, which in one embodiment may be indicated in an Annuity Data Page, of a maturity corresponding to the original or remaining length of the Investment Option Period;

G=Number of whole and partial years from the current date until the end of the Investment Option Period. If G does not correspond to the length of an observed financial instrument as defined in the Fair Value Index, We will linearly interpolate based on the values of observed financial instruments, of maturities closest to G, to determine E and F above.

The Investment Option Interim Value will not be greater than the Investment Option Maturity Value at the beginning of the Contract Year multiplied by (1+the Maximum Investment Performance Rate.) During the Accumulation Phase, the minimum Interim Value may be determined (see, e.g., block 212c). In one embodiment, the minimum Interim Value may be about or equal to: 87.5% of the Purchase Payment, accumulated at rates of interest equal to the net investment return (defined below); less any prior withdrawals from the contract, accumulated at rates of interest equal to the net investment return; and any premium tax paid by the company for the contract, accumulated at rates of interest equal to the net investment return. As used herein, "Net investment return" is defined as the rate of investment return to be credited to the contract in determining Interim Value, which reflects the investment experience of the Separate Account, subject to the guarantees set forth in this Contract. Net Investment Return also incorporates the Annual Charge. The Minimum Value can be more simply stated as 87.5% of the Interim Value at time of full surrender, less premium taxes.

In further embodiments, a Maturity Value may be calculated during the Investment Option Period (see, e.g., block 212c). Maturity Value may be implemented to reflect the performance of a specified index subject to a maximum and minimum rate. The minimum rate may be negative and expose the holder to loss of purchase payment. In one implementation, the Maturity Value may represent the total value of the annuity during the Investment Option Period; and thus be equal to the sum of the Investment Option Maturity Values during the Investment Option Period. In one embodiment in which the specified time interval is a Contract Year, the Maturity Value may be determined in accordance with Equation 2.

$$\text{Investment Option Maturity Value} = A*(1-B)*(1+C), \quad \text{Equation 2:}$$

where

A=Investment Option Maturity Value as of the later of the previous day on which a withdrawal was taken, and the beginning of the current Contract Year. At issue, this amount equals the portion of the Purchase Payment allocated to that particular Investment Option. At the beginning of the current Contract Year, this amount equals the Investment Option Maturity Value as of the end of the previous Contract Year, adjusted for Transfers.

B=The Annual Charge, if the date used in determining A in this formula is the first day of a Contract Year. Otherwise, it is zero.

C=Investment Option Performance, as described above.

The Maturity Value may be used as a basis for the Death Benefit, the Preferred Withdrawal Amount, and possibly other benefits as specified in any agreements.

Block 204b may be implemented to initiate a second time interval, such as an Access Account Period, for example, at the expiration of the Investment Option Period. Upon termination of the Investment Option Period, the Maturity Value may be transferred to a different account, such as an Access Account, subject to the annuity not being annuitized, paid out or transferred. As used herein, "transferred" does not require the physical relocation of actual funds, but rather in certain embodiments, electronic information relating to the rights, benefits, obligations, and/or other parameters may be updated. Further, as discussed in relation to block 218 below, one or more processes may be implemented to receive confirmation whether an event occurred. For example, receiving an indication that the user died may cause one or more processes to be implemented, such that the Access Account Period may not be implemented. In one embodiment, an Access Account Period may continue until a payout start date.

Block 216 may calculate one or more values relating to the second time interval, such as an Access Account Performance (block 216a) and/or Access Account Value (block 216b) which may reflect the performance of a specified index subject to a maximum and minimum rate and/or determine benefits, rights and/or obligations relating to the account. Values may be determined on a routine, such as annual basis. For example, an "Access Account Year" as used herein refers to 365 sequential days (366 on leap years) between anniversaries from the date the Access Account was first established (such as at block 204b).

Access Account Performance may be calculated as the Access Account Index value as of that date, divided by the Access Account Index value at the later of the previous date a withdrawal was paid and the anniversary of the date establishing the Access Account Period, minus one. In one embodiment, the Access Account Index value for either date will not be less than the Access Account Index Value as of the anniversary of the date that establishing the Access Account Period, multiplied by (1+the Minimum Access Account Performance Rate). Further, the Access Account Index Value for either date may not be greater than the Access Account Index Value as of the anniversary of the date that establishing the Access Account Period, multiplied by (1+the Maximum Access Account Performance Rate).

The Access Account Value may serve as the basis for some or all of the benefits during the Access Account Period. In one embodiment, the Access Account Value may be determined by Equation 3.

$$\text{Access Account Value} = A*(1+B), \quad \text{Equation 3:}$$

where

A=Access Account Value as of the later of the previous day on which a withdrawal was taken or the beginning of the Access Account Year. At establishment, this amount equals either:

i) The Maturity Value, if the establishment of the Access Account Period occurs at the expiration of the Investment Option Period; or ii) The Death Benefit, if the establishment of the Access Account Period occurs as a result of a death of the annuity holder or death of annuitant option that necessitates such establishment.

B=Access Account Performance, as described above.

Anytime during the accumulation phase (comprising both the Investment Options Period and the Access Account Period), one or more processes may be implemented to receive an indication whether an event occurred. For example, in one embodiment, block 218 may be implemented to receive an indication that the annuity holder has died. Thus, one or more processes may be implemented, such that the Access Account Period may not be implemented, terminated, or otherwise altered.

In one embodiment, receiving an indication that the annuity holder has died may implement (or permit the implementation of) one or more Death of Owner options (see block 218). In certain embodiments, Vested Beneficiary(ies) may select one of several options, yet in other embodiments, only certain options may be made available (discussed in more detail below). Exemplary options are provided below, however, those skilled in the art will readily appreciate that these are merely examples and that other options may be implemented without departing from the scope of the invention.

In one embodiment, an option may permit Vested Beneficiary(ies) to receive a Death Benefit payable within a time frame (such as for example within 5 years) of the date of the Owner's death. In this implementation, Withdrawal Charges may be waived for any withdrawals made during this 5-year period. In one embodiment, if the Vested Beneficiary(ies) dies before the end of the specified time frame and before the complete liquidation of the Death Benefit, then the Vested Beneficiary's Beneficiary(ies) may receive at least a portion of the remaining Death Benefit.

A second option may permit Vested Beneficiary(ies) to elect, within a specified time frame (for example, 11 months of the date of the Owner's death), to receive the Death Benefit paid out under one of the Income Plans that are available at that time. In one embodiment, this second option may require any Income payments to begin before a deadline (such as 1 year of the Owner's date of death).

A third option may permit Vested Beneficiary(ies) to elect to receive the Death Benefit in a lump sum. Those skilled in the art will appreciate that other options, including combinations of various aspects of the above exemplary options, may be implemented without departing from the scope of the invention.

The Options available to the Vested Beneficiary(ies) may be dependent one or more variables. For example, Vested Beneficiary(ies) may be categorized. For example, if the Vested Beneficiary consists only of the spouse, then any of the three options described above may be selected and the spouse may elect for the annuity to continue in the Accumulation Phase. If the Owner was also the Annuitant, then the Owner's spouse will be the new annuitant.

In another embodiment, if the Vested Beneficiary is a natural person who is not the original owner's spouse, or if there are multiple living Vested Beneficiary(ies), then a Vested Beneficiary(ies) may be categorized such that one of the options, such as the first option is the default absent any further selection. However, under one embodiment, each of the Vested Beneficiary(ies) may (each) choose from several options, such as described above. In another embodiment, if the Vested Beneficiary(ies) is a corporation, trust, or other Non-Natural Person, the Vested Beneficiary(ies), a categorization may require the selection of an option from a plurality of options. In one embodiment, one of the options, such as the first option, is the default absent any further selection.

Block 220 may be implemented in the determination of a Death Benefit. For example, in one embodiment, if the death occurs (or the date in which a requirement regarding the death occurs) during the Investment Option Period, the Death Benefit may be determined the greatest of:

Maturity Value, less taxes;

Interim Value, less withdrawal charges, less taxes; or

The purchase payment, adjusted in the same proportion as the Interim Value is reduced upon a partial withdrawal, less taxes.

In another embodiment, if the death (or the date in which a requirement regarding the death occurs) during the Access Account Period, the Death Benefit may be determined as the greatest of:

Access Account Value, less taxes; or

The Purchase Payment, adjusted in the same proportion as the Interim Value and Access Account Value is reduced upon a partial withdrawal, less taxes.

In certain embodiments, selecting the first or second options described above in relation to block 218 may cause the Maturity Value to be transferred to the Access Account. To the extent that the Maturity Value is less than the Death Benefit, funds may be deposited to the Access Account such that the Access Account Value equals the Death Benefit. The Death Benefit may include interest.

Further aspects of this disclosure relate to a Payout Phase of a single premium deferred annuity. A Payout Phase may be initiated upon the ending of the Accumulation Phase (see, e.g., block 222). In one embodiment, a Payout Phase is initiated directly upon applying the Maturity Value from the Investment Option Period. Yet in other embodiments, the Payout Phase follows the optional Access Account Period. For example, a Payout Phase may be initiated at a time in which the Interim Value (during the Investment Option Period), Maturity Value (at the end of the Investment Option Period) or Access Account Value (during the Access Account Period) is applied to an Income Plan. In certain embodiments, an Income Plan may comprise a series of payments on a scheduled basis. Minimum income tables, for Income Plans available at annuitization, may be based upon mortality tables, such as for example Annuity 2000 Mortality Tables, and an assumed interest rate, such as for example 1%. In certain embodiments, An adjusted Annuitization Age, the age used in calculating income payments, may be the actual age of the annuitant(s) on a payout start date, subtracted by 5 years, and then subtracted by 1 additional year for each 5 full years elapsed between Jan. 1, 2000 and the payout start date.

In one implementation, the Interim Value (if during the Investment Option Period), Maturity Value (at expiration of the Investment Option Period) or Access Account Value (during the Access Account Period) as calculated on the payout start date (optionally less any premium tax) may be applied to the an exemplary Income Plan in which payments may be made until the death of the annuitant or until the end of a Guaranteed Payment Period whichever is later. In one embodiment, a Guaranteed Payment Period may range from 0 to 240 months. In another embodiment, if the annuitant is age 90 or older on the payout start date, the Guaranteed Payment Period may range from 60 to 240 months. In certain embodiments, a Payout Phase ends when the last Income Payment is made.

While the invention has been described with respect to specific examples including presently preferred modes of carrying out the invention, those skilled in the art will appreciate that there are numerous variations and permutations of the above described systems and techniques that fall within the spirit and scope of the invention.

We claim:

1. A computerized method comprising:

receiving, by a financial development plan server, a first user input, wherein in response to receipt of the first user input, initiating, by the financial development plan server, a single deferred annuity, wherein the user input provides a desired level of protection for one or more phases of the annuity;

triggering, by the financial development plan server, an accumulation phase;

determining, by the financial development plan server, at least one of a maximum gain parameter and a maximum loss parameter based at least in part on the desired level of protection;

calculating, by the financial development plan server, the other of the maximum gain parameter and the maximum loss parameter based upon the determined maximum gain parameter or maximum loss parameter, wherein the maximum gain parameter is correlated to a stock market index, and is calculated as proportional to the maximum loss parameter;

storing, by the financial development plan server, a bail out rate with the annuity upon issuance of the annuity; and during the accumulation phase, performing at least one of:
- (i) determining, by the financial development plan server, that the bail out rate is less than the maximum gain parameter, and in response, accepting a received user input that instructs the withdrawal of financial resources of the annuity; and
- (ii) during an investment option time interval within the accumulation phase, calculating an investment option performance value.

2. The method of claim 1, wherein the accumulation phase is automatically triggered based upon the formation of the annuity and wherein the accumulation phase comprises the investment option time interval and an access account time interval.

3. The method of claim 1, wherein the investment option time interval is a predetermined quantity of time, the method further comprising:
terminating the investment option time interval before the predetermined quantity of time upon receiving, by the financial development plan server, an indication of an occurrence of a terminating event.

4. The method of claim 3, wherein the terminating event comprises the death of an individual.

5. The method of claim 1, further comprising:
receiving, by the financial development plan server, an indication that an owner of the annuity has died, and in response, calculating, by the financial development plan server, a death benefit and initiate a payout phase having at least two options for selection by a beneficiary.

6. The method of claim 5, wherein the at least two options are selected from the group consisting of: a lump sum death benefit, an income plan that must be selected before a first deadline, and a death benefit to paid out prior to a second deadline.

7. The method of claim 6, further comprising:
determining, by the financial development plan server, that the beneficiary is of a first relationship to the owner of the annuity, and based upon the determination, permitting the beneficiary to elect whether the annuity should continue in an accumulation phase with the beneficiary being an annuitant of the annuity.

8. The method of claim 5, wherein the death benefit is determined to be the greatest of: the maturity value minus at least one applicable tax, the interim value minus at least one withdrawal charge or taxes, or a purchase payment.

9. The method of claim 1, further comprising:
during the investment option time interval, calculating at least one of an interim value and a maturity value.

10. A computerized method comprising:
receiving, by a financial development plan server, a first user input, wherein in response to receipt of the first user input, initiating, by the financial development plan server, a single deferred annuity, wherein the user input provides a desired level of protection for one or more phases of the annuity;

triggering, by the financial development plan server, an accumulation phase;

determining, by the financial development plan server, at least one of a maximum gain parameter and a maximum loss parameter based at least in part on the desired level of protection;

calculating, by the financial development plan server, the other of the maximum gain parameter and the maximum loss parameter based upon the determined maximum gain parameter or maximum loss parameter, wherein the maximum gain parameter has a first absolute value and the maximum loss parameter has a second absolute value;

storing, by the financial development plan server, a bail out rate with the annuity upon issuance of the annuity;

during the accumulation phase, performing at least one of:
- (i) determining, by the financial development plan server, that the bail out rate is less than the maximum gain parameter, and in response, accepting a received user input that instructs the withdrawal of financial resources of the annuity; and
- (ii) during an investment option time interval within the accumulation phase, calculating an investment option performance value.

11. The method of claim 10, further comprising:
during the investment option time interval, calculating at least one of an interim value and a maturity value.

12. A computer-readable medium comprising computer-executable instructions that when, executed by a processor, perform at least:
receiving, by a financial development plan server, a first user input, wherein in response to receipt of the first user input, initiating, by the financial development plan server, a single deferred annuity, wherein the user input provides a desired level of protection for one or more phases of the annuity;

triggering, by the financial development plan server, an accumulation phase;

determining, by the financial development plan server, at least one of a maximum gain parameter and a maximum loss parameter based at least in part on the desired level of protection;

calculating, by the financial development plan server, the other of the maximum gain parameter and the maximum loss parameter based upon the determined maximum gain parameter or maximum loss parameter, wherein the maximum gain parameter has a first absolute value and the maximum loss parameter has a second absolute value;

storing, by the financial development plan server, a bail out rate with the annuity upon issuance of the annuity;

during the accumulation phase, performing at least one of:
- (i) determining, by the financial development plan server, that the bail out rate is less than the maximum gain parameter, and in response, accepting a received user input that instructs the withdrawal of financial resources of the annuity; and
- (ii) during an investment option time interval within the accumulation phase, calculating an investment option performance value.

\* \* \* \* \*